(12) United States Patent
Meerwald et al.

(10) Patent No.: US 8,429,345 B2
(45) Date of Patent: Apr. 23, 2013

(54) METHOD, CONTROL LOGIC AND SYSTEM FOR DETECTING A VIRTUAL STORAGE VOLUME AND DATA CARRIER

(75) Inventors: Peter Meerwald, Salzburg (AT); Kevin McGahan, Hallein (AT)

(73) Assignee: SONY DADC Austria AG, Anif (AT)

( * ) Notice: Subject to any disclaimer, the term of this patent is extended or adjusted under 35 U.S.C. 154(b) by 506 days.

(21) Appl. No.: 12/443,874

(22) PCT Filed: Sep. 14, 2007

(86) PCT No.: PCT/EP2007/008033
§ 371 (c)(1),
(2), (4) Date: May 5, 2009

(87) PCT Pub. No.: WO2008/040440
PCT Pub. Date: Apr. 10, 2008

(65) Prior Publication Data
US 2010/0011382 A1 Jan. 14, 2010

(30) Foreign Application Priority Data
Oct. 2, 2006 (EP) .................................... 06020725

(51) Int. Cl.
*G06F 12/00* (2006.01)
(52) U.S. Cl.
USPC ............................. 711/114; 711/105; 719/328
(58) Field of Classification Search .................. 711/114, 711/105; 719/328
See application file for complete search history.

(56) References Cited

U.S. PATENT DOCUMENTS

| 5,884,093 | A  | * | 3/1999 | Berenguel et al. | 710/1 |
| 6,275,898 | B1 | * | 8/2001 | DeKoning | 711/114 |
| 6,904,599 | B1 | * | 6/2005 | Cabrera et al. | 719/328 |
| 7,783,666 | B1 | * | 8/2010 | Zhuge et al. | 707/783 |
| 2002/0112161 | A1 | | 8/2002 | Thomas, III et al. | |
| 2004/0103261 | A1 | * | 5/2004 | Honda et al. | 711/202 |
| 2004/0111630 | A1 | | 6/2004 | Hwang et al. | |
| 2005/0108538 | A1 | | 5/2005 | Howard et al. | |
| 2006/0153052 | A1 | | 7/2006 | Meerwald et al. | |
| 2009/0292871 | A1 | * | 11/2009 | Watanabe et al. | 711/114 |

FOREIGN PATENT DOCUMENTS

| EP | 1 672 631 | 6/2006 |
| JP | 2003-271425 A | 9/2003 |
| JP | 2004-185644 A | 7/2004 |
| JP | 2005-149436 A | 6/2005 |
| JP | 2006-59374 A | 3/2006 |

(Continued)

OTHER PUBLICATIONS

Office Action issued Jul. 1, 2011, in European Patent Application No. 06 020 725.5.

(Continued)

*Primary Examiner* — Yong Choe
(74) *Attorney, Agent, or Firm* — Oblon, Spivak, McClelland, Maier & Neustadt, L.L.P.

(57) ABSTRACT

A method, corresponding control logic, and a correspond system for detecting a virtual storage volume. The method includes: determining a first access pattern for a read operation of a target storage volume; monitoring a second access pattern of at least one other storage volume of a computer system during the read operation; determining a correlation between the first access pattern and the second access pattern; and deriving that the target storage volume is a virtual storage volume if the determined correlation is above a predefined threshold.

28 Claims, 3 Drawing Sheets

FOREIGN PATENT DOCUMENTS

| WO | 03 015088 | 2/2003 |
|---|---|---|
| WO | WO 03/054878 A1 | 7/2003 |
| WO | WO 2004/088658 A1 | 10/2004 |

OTHER PUBLICATIONS

Office Action issued Apr. 14, 2011, in China Patent Application No. 200780037033.1 (English translation only).

"FAQ Softlock.cd" Internet Article, [Online] XP002414300 Retrieved from the Internet: URL:http://www.softlock.net/faqs.asp> [retrieved on Dec. 14, 2006].

Japanese Office Action Issued Jun. 26, 2012 in Patent Application No. 2009-530772 (with English Summary translation).

* cited by examiner

METHOD, CONTROL LOGIC AND SYSTEM FOR DETECTING A VIRTUAL STORAGE VOLUME AND DATA CARRIER

TECHNICAL FIELD

The invention relates to a method, a control logic and a system for detecting a virtual storage volume and a data carrier.

BACKGROUND

Certain copy-protection schemes for optical discs, e.g. CDROM, DVD or blue-ray disc, check if a special feature, a so-called "signature", which can not be duplicated onto optical recordable media, is present on the optical disc. Such a signature and a corresponding method for verifying the signature are disclosed for example in WO 03/054878 A1 or in EP1672631A1. A computer program is only allowed to execute if the signature is present. Copy-protection software is looking for such a signature on a target storage medium, which should be e.g. an original optical disc, and which is expected to be placed in a target storage drive, e.g. an optical disc drive. An operating system of a computer system presents a storage drive together with a storage medium as a storage volume. Other examples for such storage volumes might be provided by a USB-Stick (semiconductor memory with a USB interface), a floppy drive with a floppy disk, a memory card in a card-reader or partitions on hard disks. The wording "target storage medium", "target storage drive" and "target storage volume" is used throughout this description for the corresponding storage medium, storage drive and storage volume on which the certain data is expected to be found by the copy-protection software. Typically, the copy-protection software is checking, whether the signature is present on the target storage volume.

Emulation software intercepts the communication between the copy protection software and the optical disc drive, and manipulates the data and/or access timing information to insert false signature information. Emulation software can achieve this by presenting a virtual storage medium such as a disc image mounted on a virtual drive as a virtual storage volume to the copy protection software, while the disc image is actually stored on a hard disk drive (HDD).

Such virtual storage volumes with disc images of floppy disks, optical discs etc. are useful in certain circumstances, i.e.:

They enable users to avoid constantly changing discs.
They enable users to carry large disc libraries without the physical burden of the discs.
They can make a disc accessible to users on a network, which is very practical when it is impossible to distribute the discs to all of the users of the network.

However, in cases where the content of a copy protected optical disc is stored as a disc image on the hard disk and presented to a copy protection software (also called control logic), copy-protection schemes may be circumvented by malicious virtual drive software, which not only provides access to the content but also to the signature. The copy-protection software is not aware of the fact that the target storage volume, on which the signature is found, is not the original optical disc in an optical disc drive, but is a disc image on the hard disk drive. The original disc might be redistributed to other user(s), and the copy on the hard disk drive might be in fact an unauthorized copy.

Known methods to identify a virtual storage volume depend either on system-level software ("device drivers") or have become ineffective. Such previous methods may include separately or in combination:

requiring the target disc as target storage medium to be played in a non-SCSI (Small Computer System Interface)-drive,
querying and blacklisting a disc drive adapter's information,
querying uncommon properties of the disc drive, which are not emulated/provided by the virtual drive software, e.g measuring the interval between a start and a stop command or measuring random access time.

A further possibility to protect data content within protected areas on a target optical carrier against unauthorized reading and/or copying with a computer is disclosed in WO 2004/088658 A1. The disclosed method comprises steps of determining whether a target optical record carrier or a non-target optical record carrier is inserted into a drive of the computer, and—if a target optical record carrier is inserted into the drive of the computer—modifying read requests to the protected data areas so that no data is read or the read data is useless, and/or—modifying write commands in respect to the data within the protected data areas to a recordable carrier or other storage so that the written data is useless.

It is an object of the present invention to provide a method for detecting a virtual storage volume which is difficult to circumvent and which provides an effective way to discover whether a virtual storage volume is used in order to fake or otherwise give the impression that the presence of an original storage medium in a corresponding drive, It is a further object of the present invention to provide a control logic for detecting a virtual storage volume which enables an easy and efficient detection of such virtual storage volume, when used on a computer system to provide measures against unauthorized copying of protected software applications or data.

It is a further object of the present invention to provide a system for detecting a virtual storage volume which enables an easy and efficient detection of such virtual storage volume, which are present on such a system.

SUMMARY OF THE INVENTION

The object is achieved in a first aspect by a method for detecting a virtual storage volume, comprising the steps of
determining a first access pattern for a read operation of a target storage volume;
monitoring a second access pattern of at least one other storage volume during said read operation,
determining a correlation between said first access pattern and said second access pattern;
deriving that said target storage volume is a virtual storage volume, if said determined correlation is above a predefined threshold.

Throughout the description the wording "read operation" is used to describe a sequence of read accesses to different storage locations on a storage volume.

In other words the method is able to distinguish whether a data transfer is obtained from the virtual storage volume or from an original storage volume built of a drive and an original storage medium by querying and correlating the data transfer statistics from the operating system. So by checking the data transfers of a target storage volume (which should read the data from the original storage volume, e.g. provided by an optical disc, a floppy disk, a USB-stick, a memory card) and comparing the signal pattern during such data transfer with a signal pattern of data transfers of another storage volume, e.g. a hard disk drive, similarities are obtainable. In case the target storage volume is not represented by a virtual drive with a disc image stored on the other storage volume, e.g. the hard disk drive, the signal pattern of the data transfers from the other storage volume, e.g. the hard disk drive, and from the target storage volume should differ significantly, since the access is not related. However, in case that the target storage volume is in fact a virtual disc drive with a disc image stored on another storage volume, e.g. the hard disk drive, the signal pattern should look similar, since the access in question actually takes place on the hard disk drive. In case such a virtual storage volume is detected, appropriate measures could be taken, e.g. to refuse to run the application, to remove the disc image from the other storage volume or to instruct the user to insert the original storage medium in the corresponding drive.

With a second aspect, a control logic for detecting a virtual storage volume, the control logic being adapted to run on a computer system, said computer system comprising a target storage volume to access a target storage medium,
at least one other storage volume,
the control logic being further adapted to
determine a first access pattern for a read operation of said target storage volume;
monitor a second access pattern of said at least one other storage volume of said computer system during said read operation,
determine a correlation between said first access pattern and said second access pattern;
derive that said target storage volume is a virtual storage volume, if said determined correlation is above a predefined threshold.
is provided.

With a third aspect a system for detecting a virtual storage volume, comprising:
a computer system,
with a target storage volume to access said target storage medium,
with at least one other storage volume,
a control logic, adapted to run on said computer system, which is adapted to
determine a first access pattern for a read operation of said target storage volume;
monitor a second access pattern of said at least one other storage volume of said computer system during said read operation,
determine a correlation between said first access pattern and said second access pattern;
derive that said target storage volume is a virtual storage volume, if said determined correlation is above a predefined threshold
is provided.

With a fourth aspect a tangible data carrier is provided, having stored thereon software code components, which, when loaded onto a computer system execute the above mentioned method.

The terms "first access pattern" and "second access pattern" are used to distinguish both access pattern and do not imply any timerelationship between these access patterns.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION

Figure 1:
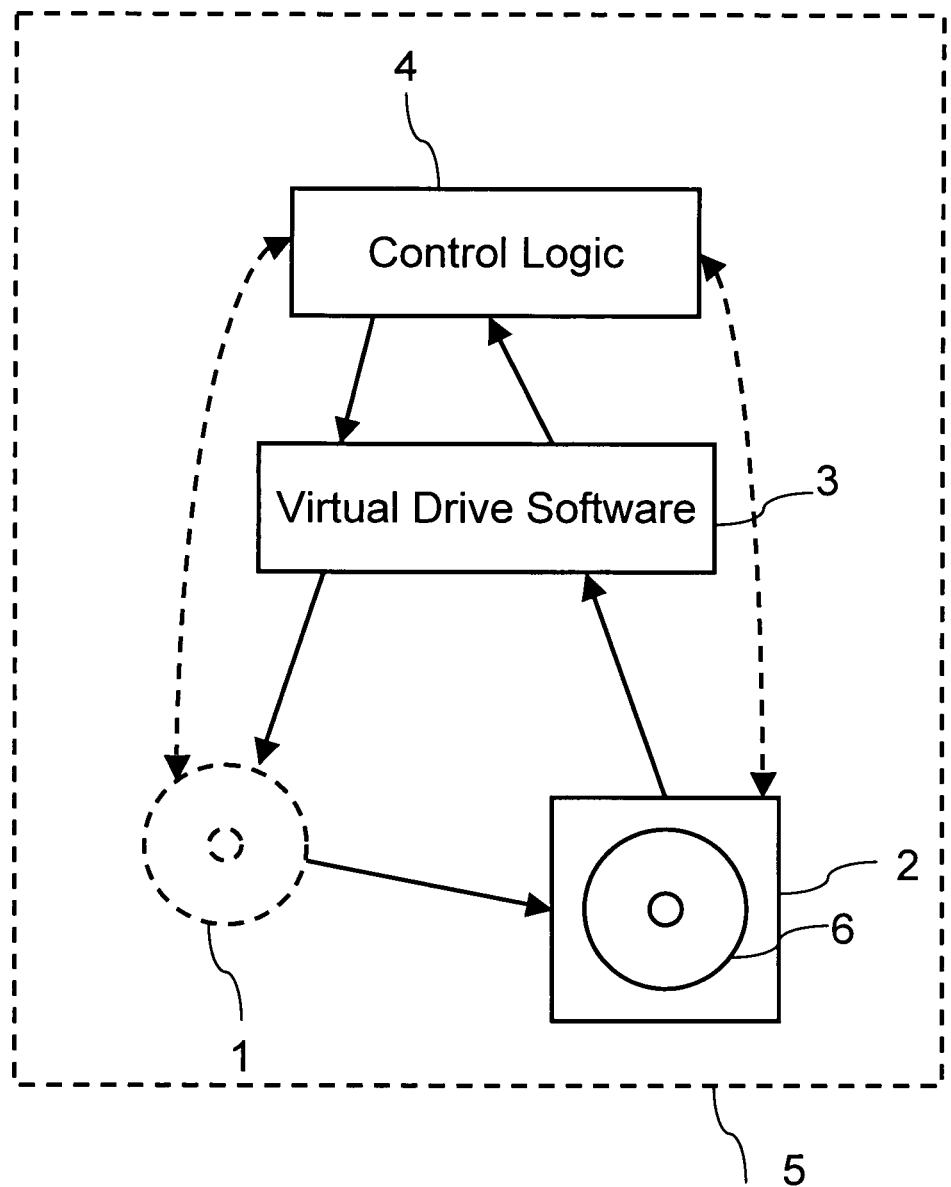
FIG. 1 shows a schematic block diagram of a system for detecting a virtual storage volume.

In FIG. 1 a schematic block diagram of the system for detecting a virtual storage volume 1 is depicted. Such a virtual storage volume 1, e.g. a virtual drive with a virtual storage medium, is created by an emulation software. The virtual drive software 3 is accessing a disc image 6, which data is actually stored on a hard disk drive 2 or another storage volume of a computer system 5, e.g. a network drive. The virtual drive software 3 or emulation software (like Daemon Tool or Alcohol 120%) presents the virtual drive 1 to a control logic 4, e.g. a copy protection software. So the virtual drive software 3 intercepts the communication between the control logic 4 and the virtual storage volume 1, thereby giving the impression (faking) that the data is actually present on a separate original optical disc, inserted into an optical disc drive and not on the hard disk drive 2 as a disc image 6. Other storage media that might be copied on a hard disk drive 2 and be accessed as a virtual storage volume 1 using the same scheme are USB-memory sticks, dongles or magnetic tapes, memory cards or the like.

A copy-protection software is typically checking, whether a characteristic which is difficult or impossible to copy (e.g. a so-called "signature") is actually present on a target storage medium, e.g. an original optical disc. Therefore, the copy-protection software accesses a target storage volume, e.g. an optical disc drive with the original optical disc, in order to check whether on the target storage medium such a signature is actually present. The virtual drive software 3 presents the virtual storage medium as such target storage medium, so that the signature is read from the disc image 6, which is actually present on the hard disk drive 2, because it has been copied (possibly without authorization) onto the hard disk drive 2. The control logic 4 is not able to detect, that the signature is in fact stored on the hard disk drive 2 and not read from the original optical disc.

In order to distinguish whether data transfer is obtained from a virtual storage volume 1 or a physical storage volume, access patterns are derived from the target storage volume and from other storage volumes of the computer system 5. Such access patterns are derivable by using performance application programming interfaces (API) of operating systems, e.g. Microsoft Windows®.

Figure 2A:
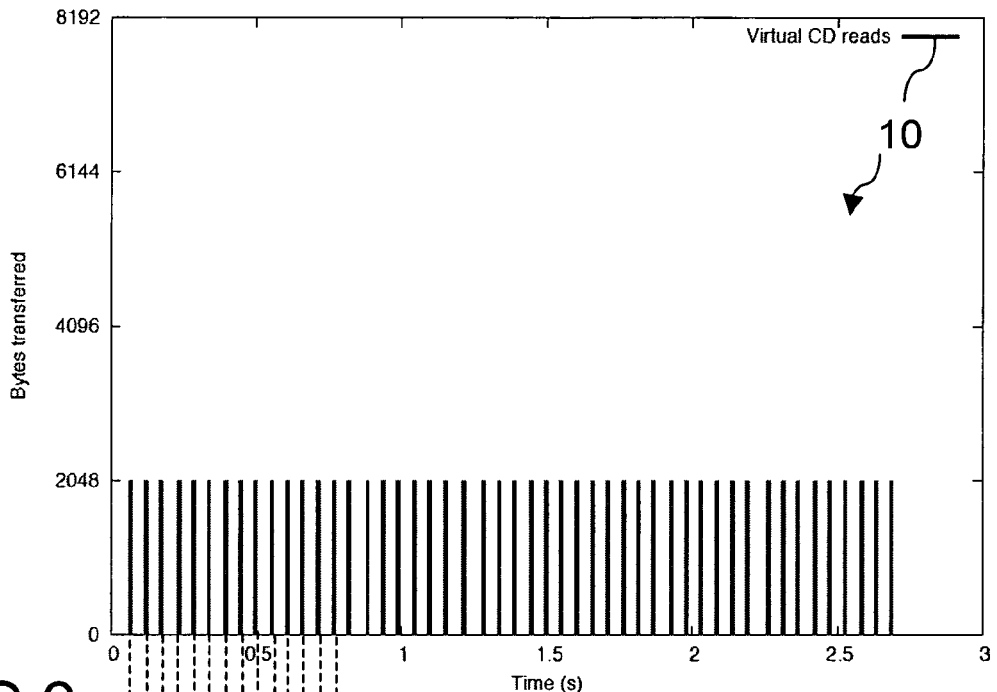
FIG. 2a shows an exemplary measurement data of a first access pattern of a target storage medium.
Figure 2B:
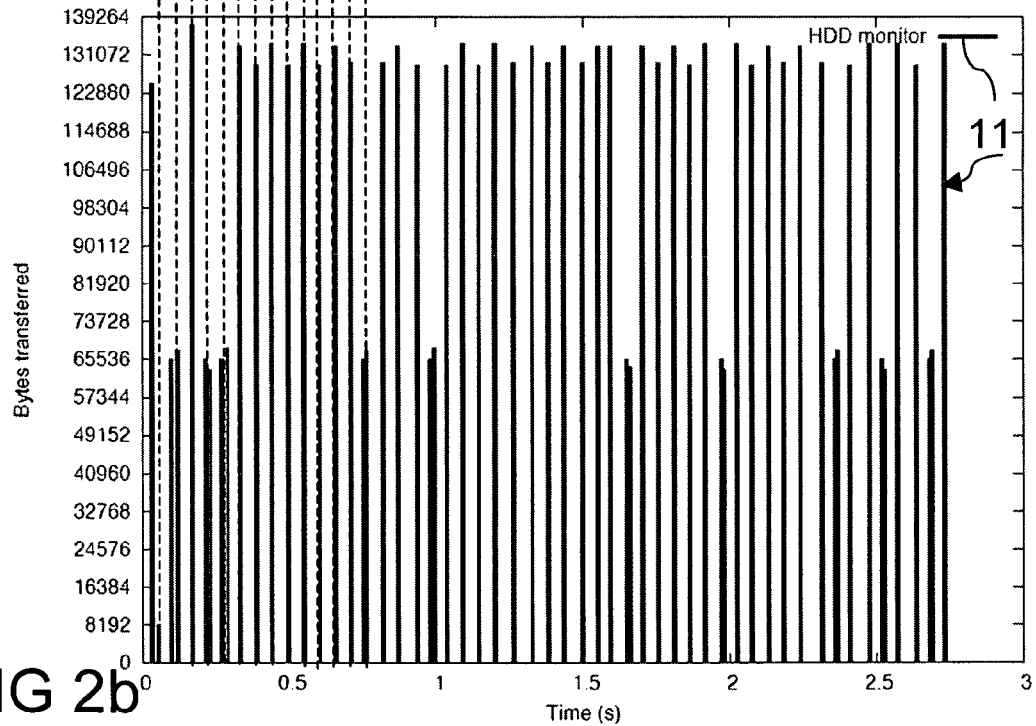
FIG. 2b shows an exemplary measurement data of a second access pattern of another storage medium of a computer system.

Examples for such performance application programming interfaces are
a) Disk Management Control Codes like IOCTL_DISK_PERFORMANCE
b) WMI (Windows Management Instrumentation), e.g. via Win32_PerfRawData_PerfDisk_LogicalDisk
c) Windows Performance Monitoring API Such performance APIs show for example, how many bytes are transferred in a given amount of time and the number of read operations (explained more in detail with respect to FIG. 2a and FIG. 2b).

Another possibility is the use of a device driver, which is able to collect such required measurement data, e.g. how many bytes are transferred in a given amount of time and the number of read operations.

Read access statistics or a first access pattern are obtained from the target storage volume which is supposed to access the original disc and a second or further access pattern is obtained from one or more hard disk drives 2. The read access statistics or access patterns are collected either continuously or during predefined time intervals. In one embodiment the access patterns are monitored while performing a verification of signature of the disc.

In a further embodiment the first access pattern is determined before actually reading the target storage volume. If the result of the read operation is known, because for example the signature of the disc is known beforehand, then the resulting first access pattern can be simulated beforehand and can be compared with the monitored second access pattern of another storage volume.

If the characteristic read access pattern resulting from the signature verification access can be statistically detected not only in the access statistics or access pattern of the target storage volume, but also in the access statistics of one of the hard disk drives 2 of the computer system 5, the control logic 4 can conclude that emulation by means of a virtual storage volume 1 is present and can start appropriate measures, e.g. to refuse to run the protected application, to remove the virtual storage volume 1 or to instruct the user to insert the original storage medium in a corresponding drive.

In FIG. 2a measurement data for a first access pattern 10 and in FIG. 2b for a second access pattern 11 are depicted. The first access pattern 10 is obtained by monitoring the access to a target storage volume: 2048 bytes are transferred every 50 ms from increasing sector numbers 65536 bytes apart. The performance data (bytes transferred) of the hard disk drive are sampled every 10 ms. In a finer resolution (not shown) it is observable that the monitored transfer from one of the other storage volumes usually slightly precedes the completion of the read request on the target storage volume.

By determining the correlation between the first access pattern 10 and the second access pattern 11 it is derived that the first access pattern 10 and the second access pattern 11 show a similar time-dependent behavior.

For example, such correlation might be determined by counting how many accesses have been executed (nearly) in parallel, and by using a predefined threshold of number of parallel accesses in order to derive whether a virtual storage volume is present. Another possibility would be to calculate according to a known algorithm a correlation value between the first access pattern 10 and the second access pattern 11 and to use a predefined threshold value between 0 and 1 (e.g. 0.5) to determine, whether a virtual storage volume is present, when the correlation value is above the threshold value.

With this high correlation value or similar access pattern it is concluded that the target storage volume is in fact a virtual storage volume 1 with a disc image 6 on the hard disk drive 2 and not a separate optical disk drive with an original optical disc.

The read-ahead logic of the virtual drive software 3 used in this example seems to be 64 sectors, i.e. 131072 bytes, explaining the large transfers on the hard disk drive 2 compared to the small transfers on the virtual storage volume 1.

Figure 3:
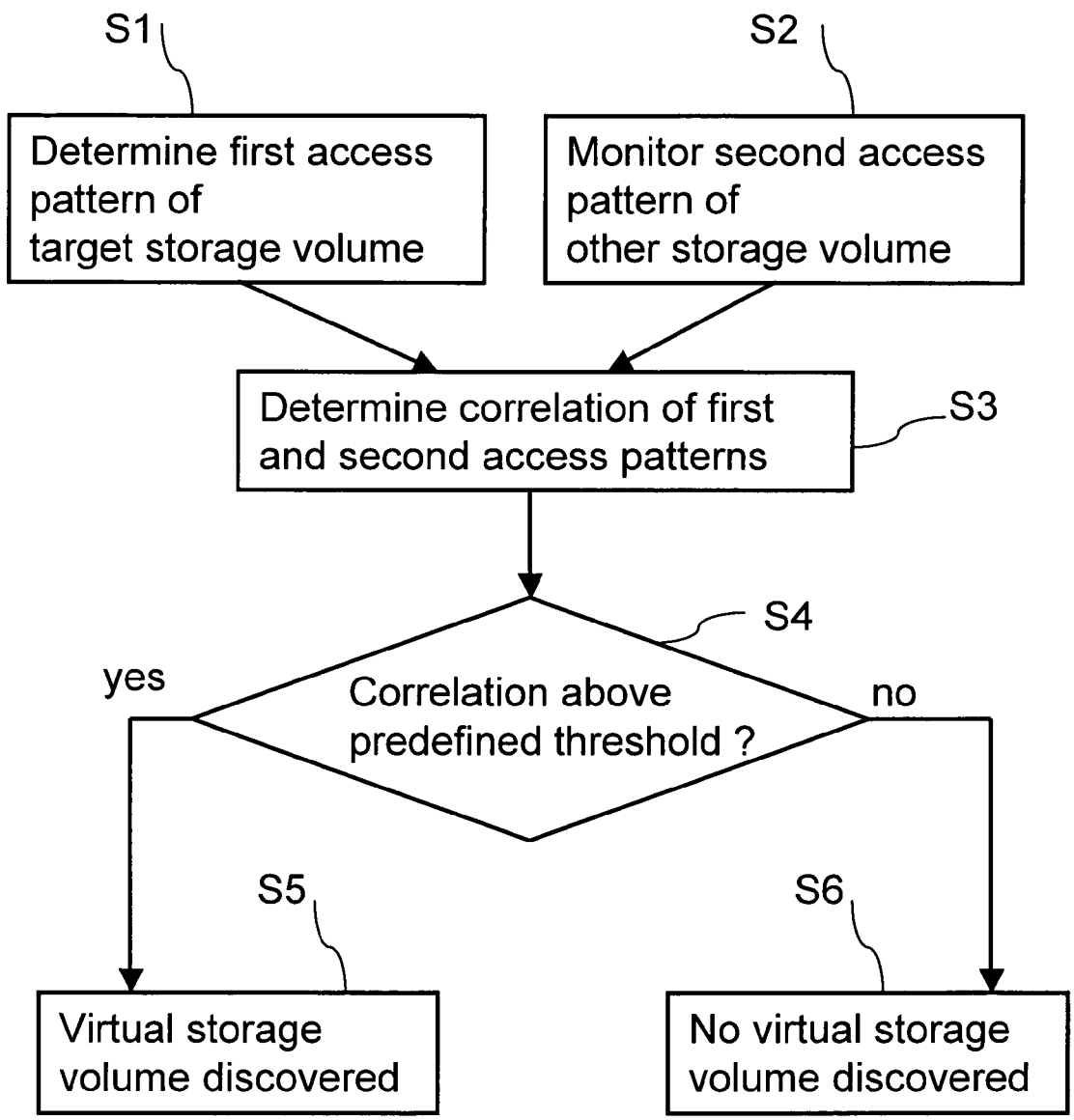
FIG. 3 shows method steps for detecting a virtual storage volume.

In FIG. 3 the method steps are depicted. In a first step S1 the first access pattern of the target storage volume is determined. In parallel during a second step S2 the second access pattern of at least one of the other storage volumes 2 is monitored. In a third step S3 the correlation of the first access pattern 10 and the second access pattern 11 is determined. Afterwards in a fourth step S4 it is evaluated whether the determined correlation is above a predefined threshold, which results in discovering a virtual storage volume 1 in a fifth step S5 in case the correlation is above the predefined threshold and otherwise in a sixth step S6 in the result that no virtual storage volume 1 is present. In the latter case it is allowed to execute the application program afterwards, since it is assumed to be on an original disc and therefore the execution is authorized.

It is possible to use additional copy protection schemes like checking, whether the signature is present on the original storage medium.

A very efficient way to implement the method is the use of statistics provided by an operating system of the computer system 5, dealing with access statistics of storage volumes, since these statistics are already present and can easily be used, e.g. by the control logic 4.

Operating systems provide so-called performance application programming interfaces (performance API), which can be sampled to determine the first access pattern 10 and the second access pattern 11.

Since the check of the signature is part of many copy protection schemes and properties like a time interval during which such signature is read by the control logic 4 and the length of the signature are known beforehand by the control logic 4, this time interval is well suited for monitoring the first access pattern 10 and the second access pattern 11. In this case it is even possible to only monitor the second access pattern 11 and determine the first access pattern 10 by simulating the read operation of the signature beforehand.

Monitoring of the access pattern can take place during predefined time intervals for using less control logic efforts during other time intervals or can take place continuously in order to further enhance the probability of detecting the virtual storage volume 1.

Since the computer system 5 may have a plurality of storage volumes 2, each of which might have stored the virtual image, the method is applicable as well for these cases, thereby monitoring access patterns 11 of every storage volume 2 and determining correlations between the first access pattern 10 and further access patterns 11 of all of the storage volumes 2 in order to find out on which storage volume 2 a virtual image has been stored.

The method may be improved by filtering the first access pattern 10 and the second access pattern 11 before determining the correlation, thereby decreasing noise effects, e.g. from other processes that are running on the computer system 5. Such filtering might include, but is not restricted to:

Disregarding very high transfers.
Disregarding very noisy signals in the time domain.
Disregarding values, wherein the number of transfers does not correlate.
Using low-pass filters or high-pass filters.

The method is applicable for optical discs as target storage medium, optical disc drives as target storage drive and a hard disk drive 2 as other storage volume.

Although the method, control logic and system have been described with respect to read operations, it is apparent that a corresponding method, control logic and system is applicable as well during write operations in order to identify, on which volume a writing process takes place actually.

REFERENCE SYMBOLS

1 Virtual storage medium
2 Hard Disk Drive
3 Virtual drive software

4 Control Logic
5 Computer System
6 Disc Image
10 First Access pattern of target storage volume
11 Second Access pattern of Hard Disk Drive
S1 First Step
S2 Second Step
S3 Third Step
S4 Fourth Step
S5 Fifth Step
S6 Sixth Step

The invention claimed is:

1. A method for detecting a virtual storage volume, comprising:
  determining a first access pattern for a read operation of a target storage volume by performing a simulation of the read operation based on a previously defined signature corresponding to the target storage volume, the read operation including signature verification of the target storage volume which includes reading the signature from the target storage volume during at least a part of the read operation;
  monitoring, after performing the simulation of the read operation, a second access pattern of at least one other storage volume during the read operation while reading the signature from the target storage volume for the signature verification of the target storage volume;
  determining a correlation between the first access pattern and the second access pattern by comparing the first and second access patterns, wherein the correlation indicates a level of similarity of time-dependent behavior between the first and second access patterns; and
  deriving that the target storage volume is a virtual storage volume when the determined correlation is above a predefined threshold.

2. The method according to claim 1, further comprising:
  determining the first access pattern by monitoring the first access pattern of the target storage volume during the read operation.

3. The method according to claim 2, further comprising:
  defining a signature before the read operation takes place, which is read at least during a part of the read operation; and
  monitoring the first access pattern and the second access pattern during the part of the read operation.

4. The method according to claim 2, further comprising:
  monitoring the first access pattern and the second access pattern during predefined time intervals.

5. The method according to claim 2, further comprising:
  monitoring the first access pattern and the second access pattern continuously.

6. The method according to claim 1, further comprising:
  using statistics of an operating system of a computer system while monitoring the first access pattern and the second access pattern.

7. The method according to claim 6, wherein the statistics are obtained via performance application programming interfaces (API) of the operating system.

8. The method according to claim 1, further comprising:
  using statistics of a device driver of the target storage volume and a device driver of the other storage volume while monitoring the first access pattern and the second access pattern.

9. The method according to claim 1, further comprising:
  monitoring further access patterns of all other storage volumes of the computer system;
  determining a correlation for each pair of the target storage volume and each of the other storage volumes; and
  deriving that the target storage volume is a virtual storage volume, if the determined correlation between the first access pattern and the further access pattern of one of the all other storage volumes is above a predefined threshold.

10. The method according to claim 1, further comprising:
  filtering the first access pattern and the second access pattern before determining the correlation.

11. The method according to claim 1, wherein the target storage volume is an optical disc drive with an optical disc and the at least one other storage volume is a hard disk drive.

12. The method according to claim 1, wherein the deriving that the target storage volume is a virtual storage volume when the determined correlation is above the predefined threshold includes:
  determining the target storage volume is a virtual storage volume on one or more non-optical disc drives, and
  determining the target storage volume is not on an optical disc drive.

13. The method according to claim 1, wherein:
  the virtual storage volume is on one or more non-optical disc drives, and
  the virtual storage volume is configured to be perceived by control logic as a separate optical disc that has been inserted into an optical disc drive.

14. The method according to claim 1, wherein:
  the first and second access patterns indicate at least one of:
  (1) a number of bytes transferred in a given amount of time in a time window; and
  (2) a number of read operations performed in a given amount of time in a time window, and
  the determining the correlation between the first access pattern and the second access includes accounting parallel or nearly parallel data transfers or read operations as occurring at the same time.

15. The method according to claim 14, wherein the deriving that the target storage volume is a virtual storage volume when the determined correlation is above a predefined threshold is a determination that the virtual storage volume and the at least one other storage volume reside on a common non-optical disc drive.

16. Control logic for detecting a virtual storage volume, the control logic being adapted to run on a computer system, the computer system comprising: a target storage volume; at least one other storage volume; and the control logic being further adapted to:
  determine a first access pattern for a read operation of the target storage volume by performing a simulation of the read operation based on a previously defined signature corresponding to the target storage volume, the read operation including signature verification of the target storage volume which includes reading the signature from the target storage volume during at least a part of the read operation;
  monitor, after performing the simulation of the read operation, a second access pattern of the at least one other storage volume of the computer system during the read operation while reading the signature from the target storage volume for the signature verification of the target storage volume;
  determine a correlation between the first access pattern and the second access pattern by comparing the first and second access patterns, wherein the correlation indicates a level of similarity of time-dependent behavior between the first and second access patterns; and derive that the target storage volume is a virtual storage volume when the determined correlation is above a pre-defined threshold.

17. The control logic according to claim 16, wherein the control logic is further adapted to:
determine the first access pattern by monitoring the first access pattern of the target storage volume during the read operation.

18. The control logic according to claim 17, wherein the control logic is further adapted to:
monitor the first access pattern and the second access pattern during at least a part of the read operation in which a pre-defined signature is read.

19. The control logic according to claim 17, wherein the control logic is further adapted to:
monitor the first access pattern and the second access pattern during predefined time intervals.

20. The control logic according to claim 17, wherein the control logic is further adapted to:
monitor the first access pattern and the second access pattern continuously.

21. The control logic according to claim 16, wherein the control logic is further adapted to:
use statistics of an operating system of the computer system while monitoring the first access pattern and the second access pattern.

22. The control logic according to claim 21, wherein the statistics are obtained via performance application programming interfaces (API) of the operating system.

23. The control logic according to claim 16, wherein the control logic is further adapted to:
use statistics of a device driver of the target storage volume and a device driver of the other storage volume while monitoring the first access pattern and the second access pattern.

24. The control logic according to claim 16, wherein the control logic is further adapted to:
monitor further access patterns of all other storage volumes of the computer system;
determine a correlation for each pair of the target storage volume and each of the other storage volumes; and
derive that the target storage volume is a virtual storage volume, if the determined correlation between the first access pattern and the further access pattern of one of the all other storage volumes is above a predefined threshold.

25. The control logic according to claim 16, wherein the control logic is further adapted to:
filter the first access pattern and the second access pattern before determining the correlation.

26. The control logic according to claim 16, wherein the target storage volume is an optical disc drive with an optical disc and the at least one other storage volume is a hard disk drive.

27. A system for detecting a virtual storage volume, comprising:
a computer system, including a target storage volume to access a target storage medium, and at least one other storage volume;
a control logic, adapted to run on the computer system, which is adapted to:
determine a first access pattern for a read operation of the target storage volume by performing a simulation of the read operation based on a previously defined signature corresponding to the target storage volume, the read operation including signature verification of the target storage volume which includes reading the signature from the target storage volume during at least a part of the read operation;
monitor, after performing the simulation of the read operation, a second access pattern of the at least one other storage volume of the computer system during the read operation while reading the signature from the target storage volume for the signature verification of the target storage volume;
determine a correlation between the first access pattern and the second access pattern by comparing the first and second access patterns, wherein the correlation indicates a level of similarity of time-dependent behavior between the first and second access patterns; and
derive that the target storage volume is a virtual storage volume when the determined correlation is above a pre-defined threshold.

28. A computer program product including a non-transitory computer readable medium including computer program instructions that cause a computer to execute a method for detecting a virtual storage volume, the method comprising:
determining a first access pattern for a read operation of a target storage volume by performing a simulation of the read operation based on a previously defined signature corresponding to the target storage volume, the read operation including signature verification of the target storage volume which includes reading the signature from the target storage volume during at least a part of the read operation;
monitoring, after performing the simulation of the read operation, a second access pattern of at least one other storage volume during the read operation while reading the signature from the target storage volume for the signature verification of the target storage volume;
determining a correlation between the first access pattern and the second access pattern by comparing the first and second access patterns, wherein the correlation indicates a level of similarity of time-dependent behavior between the first and second access patterns;
deriving that the target storage volume is a virtual storage volume when the determined correlation is above a pre-defined threshold.

* * * * *